(12) United States Patent
Durivault et al.

(10) Patent No.: US 9,863,560 B2
(45) Date of Patent: Jan. 9, 2018

(54) EXPANSIBLE THREADED JOINT AND METHOD FOR MAKING SAME

(75) Inventors: Jérôme Durivault, Valenciennes (FR); Anne-Sophie Bureau-Bayart, Bachy (FR); Eric Verger, Gommegnies (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 1184 days.

(21) Appl. No.: 13/578,947

(22) PCT Filed: Feb. 11, 2011

(86) PCT No.: PCT/FR2011/000084
§ 371 (c)(1),
(2), (4) Date: Sep. 12, 2012

(87) PCT Pub. No.: WO2011/101554
PCT Pub. Date: Aug. 25, 2011

(65) Prior Publication Data
US 2012/0325361 A1   Dec. 27, 2012

(30) Foreign Application Priority Data

Feb. 17, 2010   (FR) ..................................... 10 00664

(51) Int. Cl.
*F16L 15/00*        (2006.01)
*E21B 17/042*       (2006.01)
(Continued)

(52) U.S. Cl.
CPC ........ *F16L 15/002* (2013.01); *E21B 17/0423* (2013.01); *E21B 17/08* (2013.01);
(Continued)

(58) Field of Classification Search
CPC ........ F16L 15/002; F16L 15/004; E21B 17/08
(Continued)

(56) References Cited

U.S. PATENT DOCUMENTS

| 1,973,848 | A | * | 9/1934 | Duffy | ................. E21B 17/0423 |
| | | | | | 285/114 |
| 4,494,777 | A | | 1/1985 | Duret | |

(Continued)

FOREIGN PATENT DOCUMENTS

| EP | 488 912 A2 | 6/1992 |
| FR | 1 489 013 A | 7/1967 |

(Continued)

OTHER PUBLICATIONS

International Search Report dated Sep. 27, 2011 in PCT/FR11/000084 Filed Feb. 11, 2011.

*Primary Examiner* — James M Hewitt, II
(74) *Attorney, Agent, or Firm* — Oblon, McClelland, Maier & Neustadt, L.L.P.

(57) ABSTRACT

An expandable threaded connection includes: first and second tubular components including respective male and female ends including respective first and second and third and fourth threaded zones, insertion regions, first and second annular tongues, prominent abutment faces, and first and second concavities; the first and second tongues are respectively engaged in the second and first concavities in a made up condition, the abutment face of at least one tongue in contact with at least one concavity; the male end including a first surface between the first threaded zone and the first tongue, and the female end including a second surface between the third threaded zone and the second concavity; in the made up condition, the first and second surfaces define an annular space include large and small radial dimension zones which, after expansion, can form a metal-metal contact seal, the first tongue bearing on the second tongue.

15 Claims, 5 Drawing Sheets

(51) Int. Cl.
*E21B 17/08* (2006.01)
*E21B 43/10* (2006.01)

(52) U.S. Cl.
CPC .......... *E21B 43/106* (2013.01); *F16L 15/004* (2013.01); *Y10T 29/49826* (2015.01)

(58) Field of Classification Search
USPC .................................................. 285/333, 334
See application file for complete search history.

(56) References Cited

U.S. PATENT DOCUMENTS

| | | | |
|---|---|---|---|
| 5,154,452 | A | 10/1992 | Johnson |
| 5,765,836 | A | 6/1998 | Banker et al. |
| 5,924,745 | A | 7/1999 | Campbell |
| 6,409,175 | B1 | 7/2002 | Evans et al. |
| 7,380,840 | B2 * | 6/2008 | Sivley, IV ............ E21B 43/106 285/334 |
| 2005/0087983 | A1 | 4/2005 | Verger et al. |
| 2005/0172472 | A1 * | 8/2005 | Verger .................. E21B 43/103 29/507 |
| 2006/0162937 | A1 | 7/2006 | Costa et al. |
| 2007/0010297 | A1 | 1/2007 | Nassimi |
| 2007/0102927 | A1 | 5/2007 | Dubedout et al. |
| 2007/0132236 | A1 | 6/2007 | Dubedout et al. |
| 2007/0176422 | A1 | 8/2007 | Dubedout et al. |

FOREIGN PATENT DOCUMENTS

| | | | |
|---|---|---|---|
| FR | 2 834 326 | | 7/2003 |
| FR | 2834326 A1 * | 7/2003 | ........... E21B 43/106 |
| GB | 2 344 606 A | | 6/2000 |
| GB | 2 348 657 A | | 10/2000 |
| WO | 93 18329 | | 9/1993 |
| WO | 93/25799 A1 | | 12/1993 |
| WO | 98/00626 A1 | | 1/1998 |
| WO | 98/42947 A1 | | 10/1998 |
| WO | 99/06670 A1 | | 2/1999 |
| WO | 99/35368 A1 | | 7/1999 |
| WO | 00/61915 A1 | | 10/2000 |
| WO | WO 03/060370 A1 | | 7/2003 |
| WO | WO 2004/003416 A1 | | 1/2004 |
| WO | WO 2004/079246 A1 | | 9/2004 |
| WO | WO 2005/064217 A1 | | 7/2005 |
| WO | WO 2005/064218 A1 | | 7/2005 |
| WO | WO 2005/064219 A1 | | 7/2005 |
| WO | WO 2006/027276 A1 | | 3/2006 |
| WO | 2006/047685 A2 | | 5/2006 |
| WO | 2007/016074 A1 | | 2/2007 |

\* cited by examiner

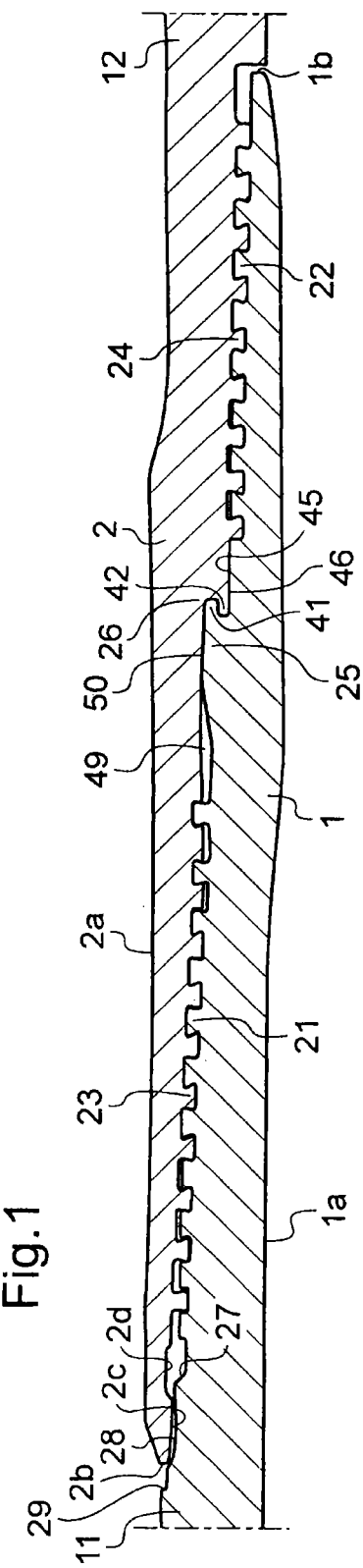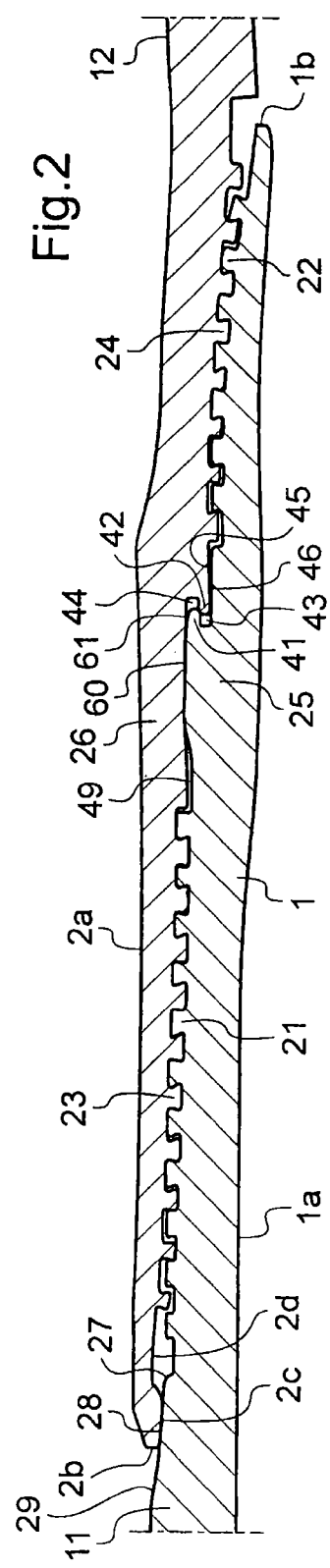

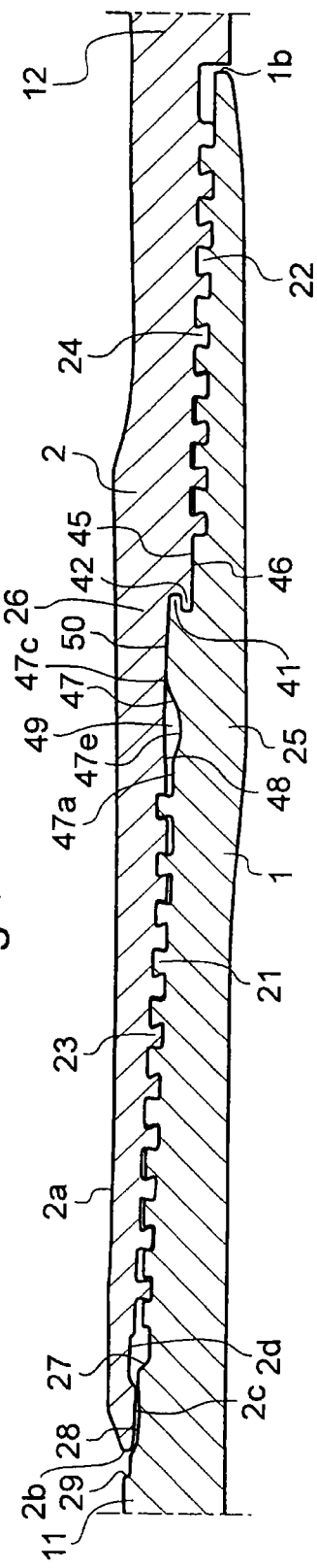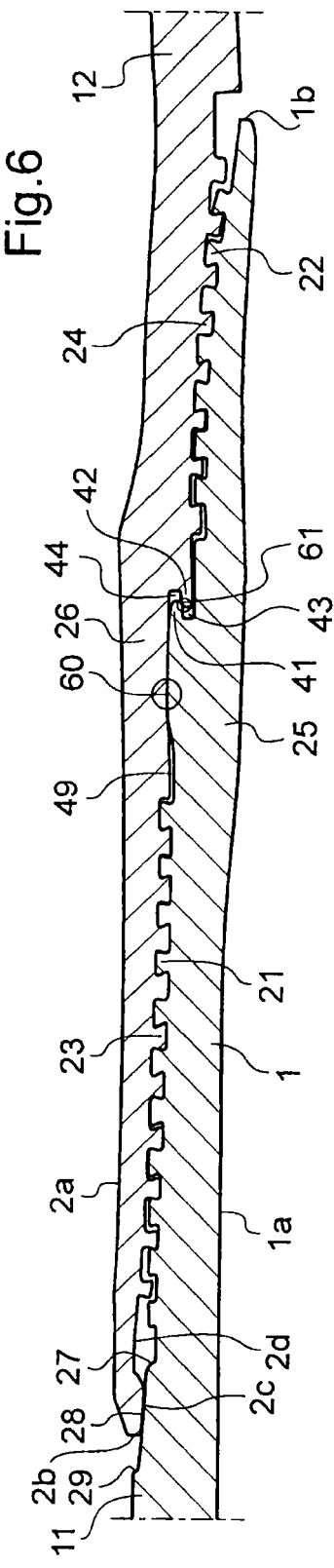

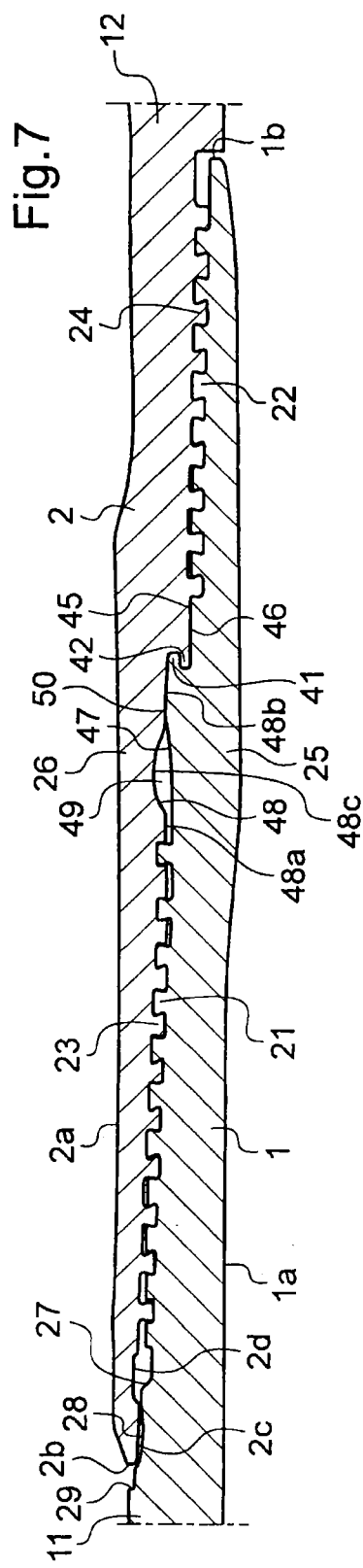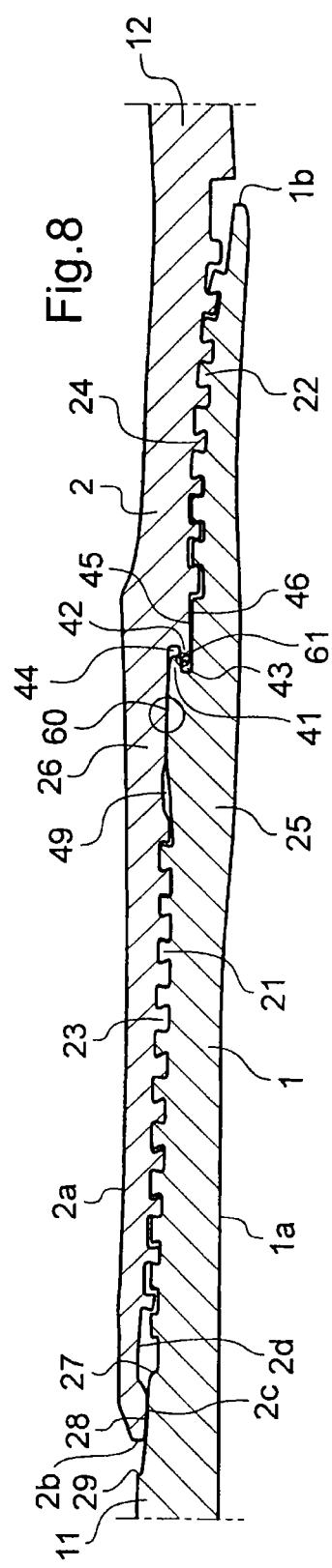

EXPANSIBLE THREADED JOINT AND METHOD FOR MAKING SAME

BACKGROUND OF THE INVENTION

The invention relates to the field of tight connections for tubular components, used in particular for hydrocarbon or the like wells, for example geothermal wells. During use, the connections are subjected to large compressive and tensile stresses and they must not come apart. The connections are also subjected to internal or external fluid pressure stresses, and bending or torsional loads, which may be in combination, of an intensity that may fluctuate and at frequencies that are likely to vary. The tightness must be guaranteed despite the loads and despite harsh on-site conditions.

For a number of years, tubes have been subjected in situ to diametral expansion causing permanent plastic deformation. The connections must remain operational after plastic deformation by diametral expansion which they undergo along with the tubes. It is desirable that following plastic diametral expansion, the threaded connections should hold, retaining the essential properties for which they are valued, in particular mechanical tension/compressive behaviour, with or without internal or external overpressure, as well as tightness.

The Applicant's patent FR-2 834 326 proposes a connection provided with two tongues engaging respectively in concavities with an S shaped profile with a radial clearance at the upper and lower portions of the "S". Contact at the end of makeup is made between the substantially radial surfaces and the substantially cylindrical surfaces of the tongues, said substantially cylindrical surfaces facing each other. During diametral expansion, one of the tongues is tipped towards the other, reinforcing the tightness of the connection.

The invention has improved the situation, in particular as regards tightness in the case in which the expansion operations are operations with a high degree of expansion (in particular more than 15%), or indeed compressive expansion operations.

The expandable threaded connection may be used in the exploration or working of hydrocarbon or geothermal wells. The expandable connection comprises a first tubular component comprising a male end comprising a first and a second threaded zones disposed on an external peripheral surface and an insertion region provided between the first and second threaded zones. The insertion region is provided with a first annular tongue comprising a prominent abutment face and a first concavity adjacent to the first tongue and set back therefrom.

The expandable threaded connection comprises a second tubular component comprising a female end comprising a third and fourth threaded zones disposed on an internal peripheral surface and an insertion region provided between said third and fourth threaded zones. The insertion region is provided with a second annular tongue comprising a prominent abutment face, and a second concavity adjacent to the second tongue and set back therefrom. The first and second threaded zones of the male end match the third and fourth threaded zones of the female end for makeup therewith. The threaded zones respectively comprise male and female threads. The first and second tongues are respectively engaged in the first and second concavities in the made up condition, the abutment face of at least one of the first and second tongues being in contact with at least the second or the first concavity. The male end comprises a first surface between the first threaded zone and the first tongue and the female end comprises a second surface between the third threaded zone and the second concavity. In the made up condition, said first and second surfaces define an annular space comprising a zone with a large radial dimension on the first and third threaded zone side and a zone with a small radial dimension on the first tongue and second concavity side. The zone with a small radial dimension is capable of forming a seal by metal-metal contact after expansion. The first tongue bears on the second tongue.

The zone with a large radial dimension promotes deformation of the male end during expansion and facilitates tipping of the first tongue towards the second tongue in order to create a metal-metal seal between said tongues. The zone with a small radial dimension enables to form a metal-metal seal between the first and second surfaces from the start of diametral expansion.

SUMMARY OF THE INVENTION

In one embodiment, a surface of the male end disposed between the first tongue and the first concavity and a surface of the female end disposed between the second tongue and the second concavity are in contact in the made up condition. Said surfaces may have a relatively small axial length compared with the axial length of said first and second surfaces.

In one embodiment, the first surface of the male end is bulged. The first surface of the male end may comprise a concave portion close to the first threaded zone and a convex portion close to the first tongue, in axial section.

In one embodiment, the first surface of the male end has a maximum diameter which is located at between one third and two thirds of its length, preferably at between half and two thirds of its length starting from the first threaded zone.

In one embodiment, close to the first tongue, the first surface of the male end has a diameter which is greater than its diameter close to the first threaded zone.

In one embodiment, the metal-metal contact seal is produced by means of a bulged portion close to the first tongue of the male end. A tapered portion may be provided close to the second concavity of the female end.

In one embodiment, the first surface of the male end is tapered close to the first tongue. The second surface of the female end may be tapered close to the second concavity.

In one embodiment, the zone with a large radial dimension on the first and third threaded zone side is defined between an internal tapered surface and an external surface in the form of a circular arc.

In another embodiment, said zone with a large radial dimension is defined between an internal surface in the form of a circular arc and a tapered external surface. In another embodiment, said zone with a large radial dimension is defined between two surfaces in the form of a circular arc.

In one embodiment, the zone with a small radial dimension on the first tongue side and second concavity side has a zero radial dimension. Optionally, interference is provided. Thus, contact occurs between the male end and the female end during makeup. From the outset, the diametral expansion generates a metal-metal seal between the first surface of the male end and the second surface of the female end.

In another embodiment, the zone with a small radial dimension on the first tongue and second concavity side has a radial non-zero dimension. Makeup is rendered easier.

In one embodiment, the first surface of the male end has an annular groove close to the first threaded zone. The second surface of the female end close to the first threaded zone may then have either an annular groove or a simple, cheap machined shape, for example in the extension of the third threaded zone. The annular groove provided from the first surface of the male end facilitates diametral expansion and tipping of the first tongue.

In another embodiment, the second surface of the female end has an annular groove close to the third threaded zone and the first surface of the male end may have a simple shape, for example in the extension of the first threaded zone.

The depth of the groove may be in the range 6% to 13% of the thickness of the regular section of the tubular component. The term "regular section of the tubular component" means the region located between its two ends, for example between a male end and a female end.

In one embodiment, the first and third threaded zones and/or the second and fourth threaded zones comprise threads which interfere both on the stabbing flanks and on the load flanks in the made up condition. However, it may be advantageous to provide a clearance on the stabbing flanks in order to promote makeup.

In one embodiment, the first and third threaded zones and/or the second and fourth threaded zones comprise radially self-hooking threads. The radially self-hooking threads may include hooks and/or flanks at negative angles. The radially self-hooking threads may be in the form of dovetails. The thread shape is selected to avoid uncoupling or jump-out.

In one embodiment, the length of the first surface of the male end is in the range 150% to 175% of the thickness of the regular section of the tubular component.

In one embodiment, the length of the second surface of the female end is in the range 145% to 170% of the thickness of the regular section of the tubular component.

In one embodiment, the length of the second concavity is in the range 16% to 24% of the thickness of the regular section of the tubular component.

In one embodiment, the thickness of the male end at the zone of the annular space with a large radial dimension is in the range 66% to 76% of the thickness of the regular section of the tubular component.

In one embodiment, the thickness of the male end at the zone of the annular space with a small radial dimension is in the range 50% to 85% of the thickness of the regular section of the tubular component.

In one embodiment, the thickness of the female end at the zone of the annular space with a large radial dimension is in the range 45% to 55% of the thickness of the regular section of the tubular component.

In one embodiment, the thickness of the male end between the first tongue and the third threaded zone is in the range 50% to 55% of the thickness of the regular section of the tubular component.

In one embodiment, the thickness of the female end between the second tongue and the fourth threaded zone is in the range 62% to 66% of the thickness of the regular section of the tubular component.

In one embodiment, the radial dimension of the first tongue and the first concavity is in the range 22% to 27% of the thickness of the regular section of the tubular component.

In one embodiment, the radial dimension of the second tongue is in the range 10% to 15% of the thickness of the regular section of the tubular component.

In one embodiment, the radial dimension of the second concavity is in the range 10% to 15% of the thickness of the regular section of the tubular component.

In one embodiment, the first and second tongues have generally rectangularly shaped axial sections.

In one embodiment, the zone of the annular space with a large radial dimension and the zone with a small radial dimension are continuous.

The invention also concerns a process for obtaining a tight threaded connection starting from a threaded connection as hereinbefore described. Said threaded connection undergoes diametral expansion in the plastic deformation range using an expansion ball with a diameter greater than the internal diameter of the tubular components. The expansion ball is axially displaced in the connection. Said annular space is dimensioned such that the first surface undergoes axial displacement towards the second surface during diametral expansion such that said first and second surfaces interfere radially, forming a metal-metal seal while allowing the zone of the annular space with a large radial dimension to subsist. Said annular space is also dimensioned such that the first surface undergoes radial displacement due to the fact that yield occurs during deformation of the female element while the male element holds.

In one embodiment, the first surface undergoes an axial displacement in the direction of the first tongue. The first tongue is tipped in the direction of the second tongue such that an internal surface of the first tongue and an external surface of the second tongue interfere radially forming a metal-metal seal. Two axially distant metal-metal seals are thereby obtained.

In one embodiment, the degree of expansion is more than 15%, preferably more than 20%.

BRIEF DESCRIPTION OF THE SEVERAL VIEWS OF THE DRAWINGS

Other characteristics and advantages of the invention will become apparent from the following description and the accompanying drawings, in which:

FIGS. 1 and 2 show, in a diagrammatic manner, in a longitudinal section, a first threaded connection in the made up condition and in the expanded condition respectively;

FIGS. 5 and 6 show, in a diagrammatic manner in longitudinal section, a second threaded connection in the made up condition and in the expanded condition respectively;

FIGS. 7 and 8 show, in a diagrammatic manner in longitudinal section, a third threaded connection in the made up condition and in the expanded condition respectively;

Figure 3:
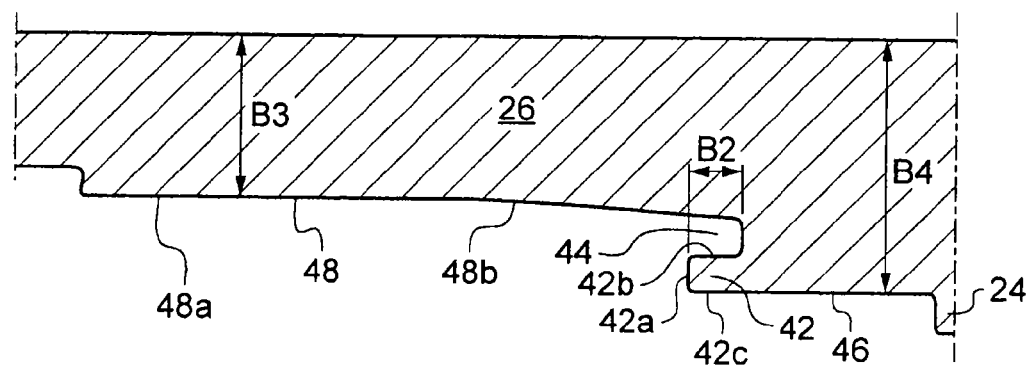
FIG. 3 is a detailed view of the female end of the first threaded connection and FIG. 4 is a detailed view of the male end of the first threaded connection.

The accompanying drawings may not only serve to complete the invention, but may also contribute to its definition if necessary. The invention is not limited to the examples of tube connections which have been described in a non-limiting manner, but encompasses any variation which could be envisaged by the skilled person.

DETAILED DESCRIPTION OF THE INVENTION

Let us now consider drilling a well for hydrocarbons, or a geothermal well. Traditionally, the top of a well is initially bored to a relatively shallow depth of a few tens of meters using a large diameter tool, of the order of 500 mm, for example, and is cased using a tubular string of this diameter. The diameter of the borehole then reduces stepwise to the well bottom which may be bored with a much smaller diameter, of the order of 150 mm in the same example. Such a well is then cased using several concentric tubular strings, each run down once boring to the corresponding diameter is complete and all suspended from the surface; the larger diameter tubes extend from the surface to a few tens of meters depth and the smaller diameter tubes extend from the surface to the bottom of the well which may be several thousand meters deep. The space between the casing tubes and the ground is cemented, for example.

After the well has been completely bored and cased, a production tubular string can be run down to lift in particular the hydrocarbons to the surface, i.e. actual working of the well. It will be understood that this tubing string has an external diameter that is slightly smaller than the internal diameter of the casing string. Outfitting a well therefore means that a large number of tubes of various dimensions are usually connected end to end using threaded connections because of the advantages of this type of connection. These tubes are sought to be as thin as possible such that the diameters of the casing tubes are not too large near the surface. However, satisfying the requirements and specifications applicable to threaded connections often leads to them having an increased thickness compared with that of the regular section of the tubes; this means that the diametral progression between concentric strings has to be increased with depth in the well.

The tubes are connected together either by making up the threaded ends of the tubes one into another (integral connections) or by using threaded couplings covering their ends. The tubes are run in successively after makeup into the end of the preceding tube or coupling.

Specification API 5 CT from the American Petroleum Institute (API) defines tubular threaded connections between two great length tubes (integral-joint tubing, extreme line casing), as well as threaded and coupled connections comprising two threaded connections for assembling two great length tubes using a coupling. These API connections can only be tight when a grease loaded with metallic particles to fill the interstices between the threads is applied.

Clearly, the connections between tubes (or between tubes and couplings) must remain tight regardless of the loads to which the tubes are subjected as they are run into the well, and over a wide range of supported weights, as each connection at least partially supports the tubes located below it. In addition, the mechanical performance of the threaded connections appear intimately linked to their geometrical characteristics.

With a threaded connection, an "efficiency" of the connection under tension is defined, which is determined by the ratio between the cross section of the tube in the area of the threading and the cross section of the tube in its length. In the case of connections with a single threading this efficiency is 100% for coupled connections with tapered threadings and run-out threads. In contrast, the coupling has an external diameter that is greater than that of the tube and is thus relatively bulky. Integral connections can only achieve 100% efficiency if the ends of the tubes are thickened considerably by forging. Two-step cylindrical threadings are less efficient for an equivalent bulk and take more time to position and make up than tapered threadings with run-out threads.

In contrast, when the pressure of the internal or external fluid exerted on the tubes becomes excessive, the threadings may disengage. This phenomenon of disengaging is linked in part to the shape of the threadings used. They are generally triangular threadings with inclined flanks and rounded crests or trapezoidal threadings with inclined asymmetrical flanks and truncated crests. In threadings with rounded triangular threads, the radial forces are large, rendering this type of threading prone to galling and disengagement of the threads.

Even so, regardless of the type of threading used, despite using greases loaded with particles, there is always a leak channel in which a fluid at high pressure can move due to a clearance between the surfaces which are not in contact. For a given tensile load, there is a threshold of fluid pressure beyond which the combined force of tension and pressure causes, in API threaded connections, disengagement of the threadings of male and female portions in contact.

Threaded connections have been improved to avoid this situation: as an example, patents FR 1 489 013, EP 488 912, U.S. Pat. No. 4,494,777 are intended to produce premium tubular threaded connections which are particularly tight due to appropriately arranged metal-metal sealing surfaces and abutments between male and female elements.

This may be accomplished by means of two tapered sealing surfaces in interfering contact, the male sealing surface being disposed externally beyond the male threading and the female sealing surface being disposed in a corresponding manner on the female element. Transverse abutments are used jointly to position the sealing surfaces and to reinforce their effect. However, there is still a risk that the tapered bearing surfaces will separate under the effect of an external pressure and there is a risk of deterioration and separation of the surfaces under the compressive and tensile loads that are applied when running the tubes into a well or in service.

After running a tubular string into a well, it is then intended to submit it to diametral expansion, with permanent plastic deformation. This is carried out, for example, using a ball which is forced through the interior of the string: see WO-93/25799, WO-98/00626, WO-99/06670, WO-99/35368, WO-00/61915, GB 2344606, GB 2348657. This has many potential advantages:

a low bulk string can be run in and then forcibly expanded;
in this manner, a casing string can be put into position;
similarly, holes in a casing or tubing string caused by corrosion or friction of the drill pipe can be blocked, or low bulk tubes can be run into the well and then expanded to the desired diameter once in place;
finally and especially, wells with a uniform diameter can be bored over a minimum of two successive casing strings. The casing is produced by several strings of tubes all of the same diameter, the tubes being introduced in the unexpanded state then being expanded in situ to the diameter of the well.

It is then possible to substantially reduce the number of tubes necessary to outfit a well, by dispensing with tubes with a large diameter and with a greater thickness. The cost of the well is reduced as a consequence. It should even be possible to bore the well directly with the casing string, which would act as a drill pipe string. However, producing threaded connections that maintain performance after said expansion is extremely difficult, even more so because it has to be reliable (all of the connections must hold) and stable under the operating conditions.

U.S. Pat. No. 5,924,745 and WO-98/42947 describe threaded connections for undergoing expansion. However, they pertain to connecting components known as EST (expandable slotted tubings) components provided with longitudinal through slots, and which undergo diametral expansion at the bottom of a hydrocarbon well (by passing an expansion mandrel into said tubes); when enlarged, the slots allow a fluid outside the component (hydrocarbon from the well) to enter the component and be lifted to the surface. In this case, the seal of the connections is clearly not important and since they are at the bottom of the well, they also are not subjected to a high mechanical load. The invention is concerned with tubes which are sealed of themselves and not with that type of component which is permeable by design.

The first proposals for the plastic expansion of tubular strings were based on welded connections (rolls of tubes pre-abutted by welding, unrolled from the surface) or on slip connections (slips). However, such connections do not have the performance of threaded connections, in particular as regard the combination of mechanical strength, tightness under varied service conditions, and also the possibility of dismantling/reassembling time after time.

Conventional threaded tubular connections such as those of U.S. Pat. No. 4,494,777 do not tolerate plastic diametral expansion. After expansion of such connections, the following is observed:
- an absence of a seal (which also prevents expansion by pushing the ball through the string hydraulically);
- deflection of the male end towards the interior of the connection, which considerably and unacceptably reduces the operational internal diameter of the string by producing an internal recess into the space defined by the operational internal diameter;
- possibly, rupture of the male end lip by exceeding the deformation capacity in certain particularly stressed zones due to the variations in thickness along the male and female elements compared with the thickness of the tube body.

It has been sought to provide a tight threaded connection with the intention of connecting components which themselves have a sealed structure and have the desired operational capabilities after expansion. The sealed threaded connection that has been sought should be appropriately protected against the risk of disengagement of the threads.

Document WO-2005/064219 proposes a male end provided with a lip which enters a recess of the female end, the male end entering and partially prominent into a groove of the female end during expansion. The lip of the female end must be particularly robust in order to resist the force exerted by the lip of the male end while also being sufficiently long to avoid a loss of contact between said lips due to axial displacement caused by the diametral expansion. Further, the risk of disengagement of the threads is still present. Furthermore, the efficiency under tension of that type of connection is substantially reduced because of the small critical section of the female element, which limits the mechanical performance of such a connection. At the same time, for high degrees of expansion, the relative displacement between the male element and the female element at the internal bearing surface may provoke a loss of contact and disengagement of the lip from the groove.

The document U.S. Pat. No. 6,409,175 proposes adding a supplemental sealing element close to the terminal surface of the male end. The recess necessary for the sealing element weakens the male end by reducing the critical section. The risk of disengagement of the threads and the radial displacement of the male and female ends with respect to each other remains unchanged.

Document US-2006/162937 describes a sleeve added to the connection from the outside. The sleeve occupies an additional thickness, whence a reduction in useful diameter. Expansion becomes more difficult at the sleeve, which requires an undesirable, increased expansion pressure.

Document US-2007/10297 is similar to FR 2 834 326. The critical section of the female end is relatively small.

Document WO-2006/47685 describes an expandable threaded connection with threads with a progressively increasing length resulting in a zero clearance between the flanks in the made up condition. A radial clearance subsists between the thread roots and crests, resulting in a mediocre seal. Further, expansion risks re-creating an axial clearance between the thread flanks which were in contact before expansion. Thus, the risk of leak is significant.

Document WO-2007/16074 proposes a metal-metal contact seal between two threading portions. The threads have a progressive axial length with a zero clearance between the flanks at the end of makeup. That type of contact can barely resist high diametral expansion. The male and female ends tend to become separated, thereby creating a radial space due to resilience, differential plastic deformation and residual stresses in particular. Further, that type of connection is highly sensitive to the conditions under which diametral expansion is carried out.

In FIG. 1, a connection comprises a male threaded element or end 1 disposed at the end of a first tube 11. The male end 1 is made up and abuts into a female threaded element or end 2 disposed at the end of a second tube 12. The internal diameter of the male threaded end here is equal to the internal diameter of the tubes 11, 12. The external diameter of the female threaded end 2 is equal to the external diameter of the tubes 11, 12; this is solely by way of example. The connection is shown in FIG. 1 in the condition whereby it has been simply made up in abutment before any diametral expansion operation. In FIG. 2, the connection is shown in the expanded condition. The second tube 12 as shown is a great length tube. In a manner that is not shown, this second tube could be a coupling provided on one side with a female end 2 and on the other side with a female end that may or may not be symmetrical with respect to a radial plane and made up into a male element located at the end of another great length tube.

The male end 1 comprises a bore 1a which is generally cylindrical with a tapered portion close to the lip/groove zone. The male end 1 comprises a terminal surface 1b, in this case substantially radial in shape. The terminal surface 1b of the male end 1 is axially distant from the female end 2. The male end 1 comprises a first threaded zone 21 disposed on an external peripheral surface and a second threaded zone 22 also disposed on its external peripheral surface and having a smaller diameter. In corresponding manner, the female end 2 comprises a third threaded zone 23 which matches the first threaded zone 21 and a fourth threaded zone 24 which matches the second threaded zone 22. In the made up condition, the first and third threaded zones 21 and 23 are engaged and the second and fourth threaded zones 22 and 24 are engaged. Each threaded zone 21, 22, 23, 24 is provided with threads.

Figure 13:
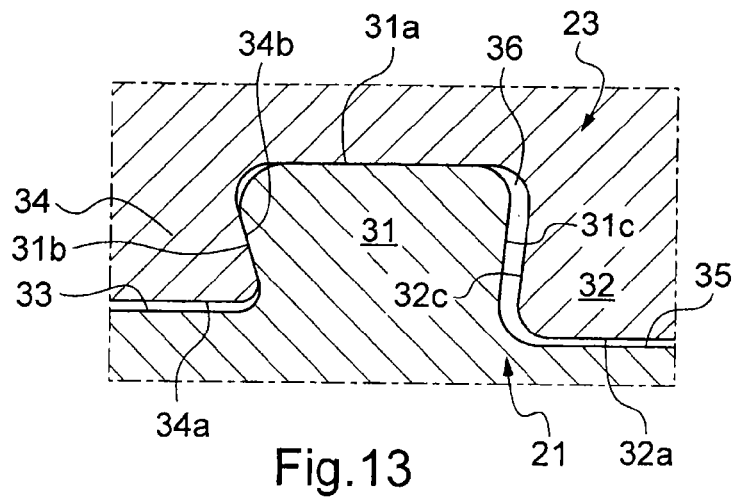
FIG. 13 is a detailed view of a dovetail thread.

In the embodiment shown, the threads are self-hooking radially at negative angles in order to obtain prevention against jump-out of the thread; see FIG. 13 as well. In other words, at least a portion of the threads have teeth which are wider close to their crest than close to the roots.

FIG. 13 shows, in the made up condition, dovetail threads with stabbing flanks and load flanks forming an acute angle with respect to the corresponding crest. More particularly, a tooth 31 of the threaded zone 21 has a crest 31a which is substantially cylindrical in shape, a load flank 31b and a stabbing flank 31c. The tooth 31 is surrounded by roots 33 and 35. The tooth 31 engages in the threaded zone 23 in the made up condition, more precisely prominent into a root 36 between the teeth 32 and 34. The crest 31a of the tooth 31 is in contact with the root of the root 36. The teeth 32, 34 of the female threaded zone 22 are each provided with a crest 32a, 34a at a small radial distance from the corresponding roots 33 and 35 of the male threaded zone 21. The threaded zones 21 and 23 are tapered. The diameter of the root 33 is greater than the diameter of the root 35. The diameter of the tooth 34 is greater than the diameter of the tooth 32.

The load flanks 31b of the tooth 31 and 34b of the tooth 34 are in mutual contact. The stabbing flanks 31c of the tooth 31 and 32c of the tooth 32 are separated by a small axial distance. However, in a variation, the threadings may be of the interference type on the stabbing flanks. In this case, the stabbing flanks 31c and 32c are in contact in the made up condition.

Referring now to FIGS. 1 and 2, in the made up and expanded condition, the second threaded zone 22 of the male end 1 may extend to close to the terminal surface 1b or be separated therefrom by a cylindrical or slightly tapered surface. Between the threaded zones 21 and 22, the male end 1 comprises a male insertion region 25 in contact with a female insertion region 26 provided on the female end 2 between the third and fourth threaded zones 23 and 24. Beyond the first threaded zone 21 and in the direction of the first tube 11, the male end 1 comprises a shoulder 27, for example tapered, followed by a substantially tapered sealing portion 28 connecting to an external surface of the first tube 11 via a second shoulder 29. The female end 2 comprises an external surface of revolution 2a and a terminal surface 2b, in this case with a rounded shape, which is distant from the shoulder 29 in the made up condition. Between the terminal surface 2b and the third threaded zone 23, the female end 2 comprises an internal surface 2c in contact with the tapered surface 28 in the expanded condition and possibly in the made up condition. The internal surface 2c close to the terminal surface 2b may be cylindrical in shape or, as is preferable, bulged, for example in the form of a circular arc.

The internal surface 2c can link directly to the third threaded zone 23 of the female end 2 or via a concave zone 2d substantially facing the shoulder 27 of the male end 1 in the made up and expanded condition. The concavity 2d provides flexibility to preserve contact after expansion between the interior surface 2c and the tapered surface 28 and to prevent the terminal surface 2c from lifting radially.

Figure 4:
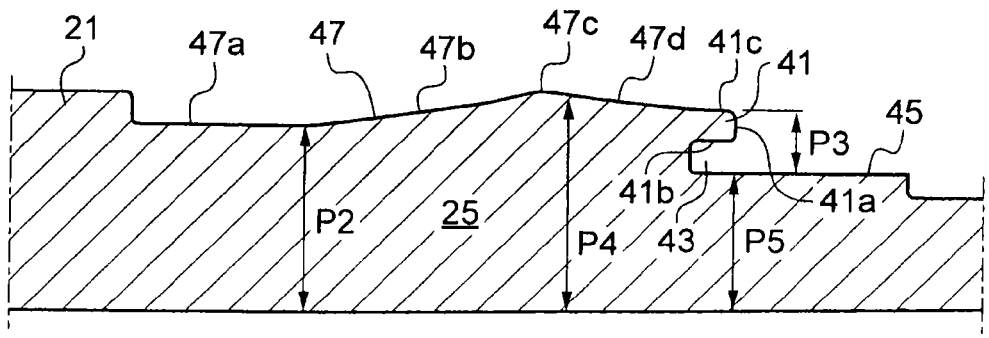

The male 25 and female 26 insertion regions can be seen in more detail in FIGS. 3 and 4. The male insertion region 25 comprises a first tongue 41. The female insertion region 26 comprises a second tongue 42. The tongues 41 and 42 are annular. Each tongue 41, 42 comprises a free end forming a prominent face 41a, 42a for abutment. Each tongue 41, 42 comprises a small diameter surface 41b, 42c which is cylindrical or slightly tapered and a large diameter surface 41c, 42b which is cylindrical or slightly tapered. The large diameter surface 41c is tangential to a first large diameter surface 47 of the male insertion region 25.

Each male 25 or female 26 insertion region respectively comprises a first concavity 43 or rebate and a second concavity or rebate 44, adjacent to the first tongue 41 and to the second tongue 42. The small diameter surface 41b of the first tongue 41 defines the first concavity 43, forming its external wall. The small diameter wall of the concavity 43 here is formed by a substantially cylindrical surface 45 extending into said first concavity 43 and up to the second threaded zone 22. The bottom of the concavity 43 may be substantially radial in shape. The large diameter surface 42b of the second tongue 42 provides the radially innermost limit of the second concavity 44, thereby forming the small diameter wall. The large diameter wall of the second concavity 44 is formed by a second surface 48 of the female insertion region 26, locally with a slightly tapered or rounded shape. The bottom of the second concavity 44 has a substantially radial shape. The female insertion region 26 has a surface 46 that is tangential with the small diameter surface 42c of the second tongue 42 and extends between said second tongue 42 and the fourth threaded zone 24 of the female end 2. In the made up condition, the surfaces 45 of the male insertion region 25 and 46 of the female insertion region 26 are disposed axially at the same level and may be in contact or separated by a slight radial clearance.

In general, the first tongue 41 and the first concavity 43 have an S shaped profile. The second tongue 42 and the second concavity 44 have an inverse S shaped profile with dimensions that correspond so that in the made up condition, the first tongue 41 is prominent into the second concavity 44 and the second tongue 42 is prominent into the first concavity 43. In the made up condition, the small diameter surface 41b of the first tongue 41 is in contact with the large diameter surface 42b of the second tongue 42. In the expanded condition, a slight axial setback may occur, while said contact between the first and second tongues 41 and 42 is preserved.

The first surface 47 has a diameter that is larger than the diameter of the surface 45. The external surface 47 extends between the first threaded zone 21 and the first tongue 41. In the embodiment of FIGS. 3 and 4, the first surface 47 comprises, a first substantially cylindrical portion 47a close to the first threaded zone 21, a second substantially tapered portion 47b with a diameter which increases from the first portion 47a, a rounded peak 47c, and a third portion 47d with a substantially tapered shape and with a diameter which decreases with distance from the first threaded zone 21. The third portion 47d joins up with the large diameter surface 41c of the first tongue 41 in a tangential manner.

Facing the first surface 47 of the male insertion region 25, the second surface 48 extends between the third threaded zone 23 and the second concavity 44. Before expansion, the second surface 48 comprises a first portion 48a close to the third threaded zone 23 and with a substantially cylindrical shape, and a second portion 48b extending the first portion 48a up to the second concavity 44 and being in the form of a circular arc.

As can be seen in FIG. 1, in the made up condition the first and second surfaces 47 and 48 leave between them an annular space comprising a zone with a large radial dimension 49 on the first 21 and third 23 threaded zone side and a zone 50 with a small or zero radial dimension on the first tongue 41 and second concavity 44 side. Because of the scale used, the zone 50 shown in FIG. 1 appears to have a zero radial dimension. However, the zone 50 may have a zero radial dimension close to the peak 47c of the first surface 47 and a small but non-zero radial dimension beyond the peak 47c. Alternatively, the small radial dimension zone 50 is continuous, even where it is close to the peak 47c.

The first surface 47 has a generally bulged shape. The peak 47c of the first surface 47 is located at between one third and two thirds of the length of said first surface 47 starting from the first threaded zone 21, preferably at between half and two thirds of its length. The third portion 47*d* has a diameter that is greater than the diameter of the first portion 47*a*.

In the expanded condition shown in FIG. 2, the zone with a large radial dimension 49 subsists over a reduced length and with a radial dimension that is also reduced. A metal-metal contact 60 results from crushing the peak 47*c* of the first surface 47 against the rounded portion 48*b* of the second surface 48 of the female insertion region 26.

The first and second tongues 41 and 42 withdraw slightly from the second and first concavities respectively. This results in an axial distance between the prominent face 41*a* of the first tongue 41 and the bottom of the second concavity 44, and of the prominent face 42*a* of the second tongue 42 with respect to the bottom of the first concavity 43. The first tongue 41 pivots slightly clockwise. In other words, the diameter of the first tongue 41 tends to reduce, in particular close to its prominent face 41*a*. A second metal-metal contact 61 is created at the interface between the small diameter surface 41*b* of the first tongue 41 and the large diameter surface 42*b* of the second tongue 42.

Dimensioning of the connection is particularly complex. In this embodiment, the following dimensions, used individually or otherwise, are highly suitable:
- the length of the first surface 47 of the male end 1 is in the range 150% to 175% of the thickness of the regular section of the tubular component;
- the length of the second surface 48 of the female end 2 is in the range 145% to 170% of the thickness of the regular section of the tubular component;
- the length of the second concavity 44 is in the range 16% to 24% of the thickness of the regular section of the tubular component;
- the thickness of the male end 1 at the zone of the annular space with a large radial dimension is in the range 66% to 76% of the thickness of the regular section of the tubular component;
- the thickness of the male end 1 at the zone of the annular space with a small radial dimension is in the range 75% to 85% of the thickness of the regular section of the tubular component;
- the thickness of the female end 2 at the zone of the annular space with a large radial dimension is in the range 45% to 55% of the thickness of the regular section of the tubular component;
- the thickness of the male end 1 between the first tongue and the third threaded zone is in the range 50% to 55% of the thickness of the regular section of the tubular component;
- the thickness of the female end 2 between the second tongue and the fourth threaded zone is in the range 62% to 76% of the thickness of the regular section of the tubular component;
- the radial dimension of the first tongue 41 and the first concavity 43 is in the range 22% to 27% of the thickness of the regular section of the tubular component;
- the radial dimension of the second tongue 42 is in the range 10% to 15% of the thickness of the regular section of the tubular component;
- the radial dimension of the second concavity 44 is in the range 10% to 15% of the thickness of the regular section of the tubular component.

In the embodiment shown in FIGS. 5 and 6, elements which are similar to those in the preceding embodiment have retained the same reference numerals. The second surface 48 of the female insertion region 26 of the female end 2 is similar to the preceding embodiment. The first surface 47 of the male insertion region 25 of the male end 1 comprises an annular groove 47*e* forming a rounded root 47*e* in axial section. The groove 47*e* is located between the first portion 47*a* and the peak 47*c*. In other words, in this embodiment, groove 47*e* replaces the second tapered portion 47*b* of FIG. 4. The groove 47*e* enables on the one hand to increase the radial dimension of the annular space in its large radial dimension zone 49 and on the other hand to facilitate the expansion operation by reducing the subsisting thickness of the male end 1. The force necessary for expansion is thereby reduced. The depth of the groove 47*e* is in the range 6% to 13% of the thickness of the regular section of the tubular component, i.e. between the ends.

Further, by increasing the possible radial displacement of the material constituting the male end 1 radially outwardly before contact with the second surface 48 of the female insertion region 26 of the female end 2, the groove 47*e* enables to increase the phenomenon of the radially inward pivoting of the first tongue 41. This phenomenon corresponds to pivoting of the tongue 41 about a geometrical axis located approximately at the peak 47*c* or in a zone located in the thickness of the male insertion region 25 and axially substantially at the peak 47*c*. In the expanded condition shown in FIG. 6, the zone with a large radial dimension 49 of the annular space still exists to some extent. A metal-metal contact 60 is created substantially at the peak 47*c* especially within the circle shown in FIG. 6. A supplemental metal-metal contact 61 is created between the tongues 41 and 42 in the zone circled in FIG. 6.

In the embodiment of FIGS. 7 and 8, the male end 1 is similar to that of the first embodiment. The female end 2 is provided with a groove 48*c* produced in the female insertion region 26 between the first substantially cylindrical portion 48*a* and the second region 48*b* which in this case is substantially tapered. The groove 48*c* is annular and rounded in axial section. The groove 48*c* enables to increase the radial dimension of the large radial dimension zone 49 compared with the first embodiment. The radial outward displacement of the male insertion region 25 during expansion is facilitated thereby; engaging contact of the first surface 47 with the groove 48*c* is retarded compared with the first embodiment. However, the tipping of the first tongue 41 may be slightly less than that observed with the embodiment of FIGS. 5 and 6. The groove 48*c* has a depth in the range 6% to 13% of the thickness of the regular section of the tubular component.

Figure 9:
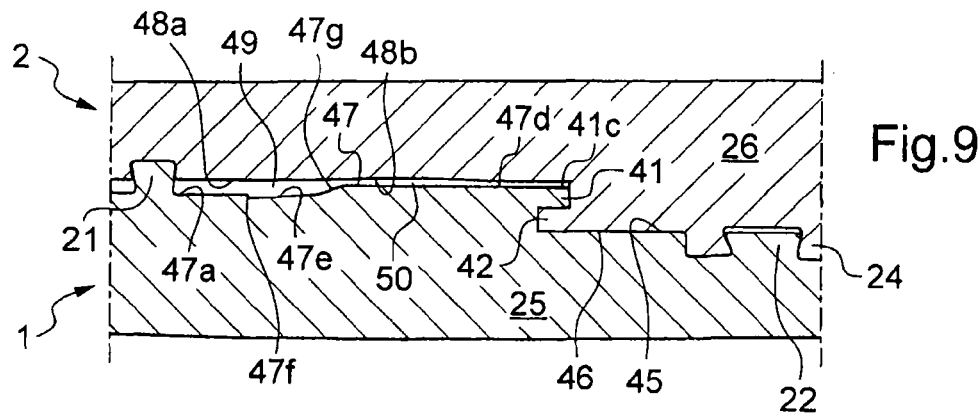
FIGS. 9 and 10 show, in a diagrammatic manner in partial longitudinal section, a fourth threaded connection in the made up condition and in the expanded condition respectively.
Figure 10:
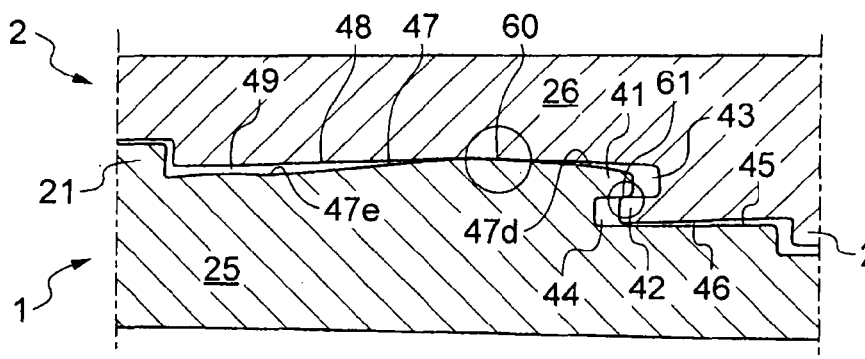

In the embodiment of FIGS. 9 and 10, the annular space comprising the zone with a large radial dimension 49 and the zone with a small radial dimension 50 is continuous. In other words, the first surface 47 and the second surface 48 are radially distant in the made up condition. The first surface 47 comprises a first portion 47*a* located in the extension of the threaded zone 21, for example with a small taper, facilitating displacement of the cutting tools. Next, moving away from the threaded zone 21, the first surface 47 comprises a slight shoulder 47*f* defining the groove 47*e*. On the other side, the groove 47*e* is defined by a tapered portion 47*g* connecting to the large diameter portion 47*d* tangentially to the large diameter surface 41*c* of the first tongue 41. The large diameter portion 47*d* may be cylindrical. The second surface 48 of the insertion region 26 of the female end 2 comprises a first substantially cylindrical portion 48*a* and a second portion 48*b* which is very slightly outwardly bulged, for example formed as a circular arc.

In the expanded condition illustrated in FIG. 10, the large radial dimension zone 49 subsists with a reduced radial dimension. The groove 47e tends to become filled by displacement of the material of the male insertion region 25 radially outwardly. The large diameter portion 47d of the first surface 47 will deform outwardly in a circular arc, in contact with the second portion 48b of the second surface 48, to form a metal-metal contact 60. A supplemental metal-metal contact 61 is formed by the radially inward displacement of the tongue 41, interfering diametrically with the second tongue 42.

Figure 11:
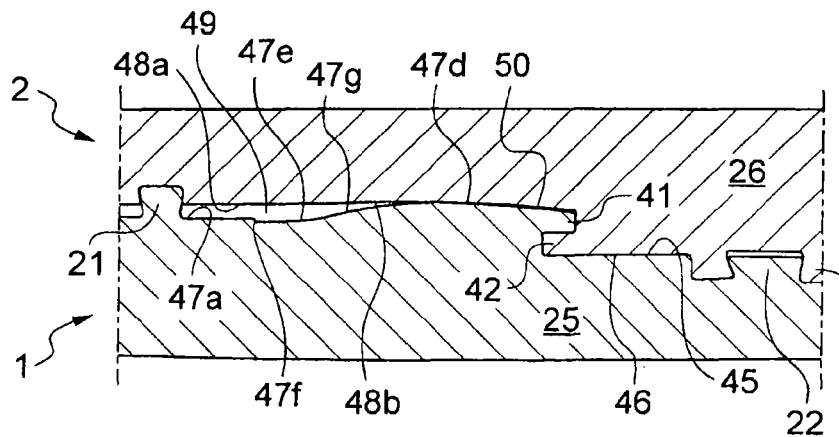
FIGS. 11 and 12 show, in a diagrammatic manner in partial longitudinal section, a fifth threaded connection in the made up condition and in the expanded condition respectively.
Figure 12:
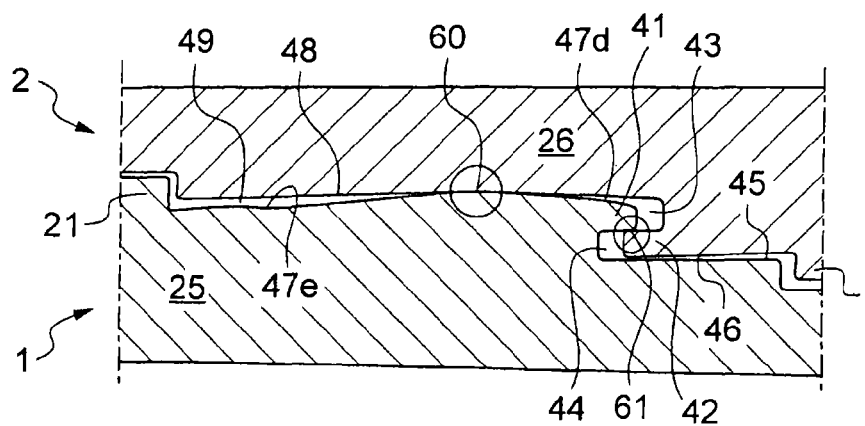

In the embodiment of FIGS. 11 and 12, the first surface 47 differs from the preceding embodiment in that the large diameter portion 47d is bulged into a circular arc in axial section and on makeup comes into contact with the second portion 48b of the second surface 48 of the female insertion region 26. In other words, the small radial dimension 50 zone has a zero radial dimension. The second surface 48 is analogous to that of the preceding embodiment.

In general, during the diametral expansion, a metal-metal contact 60 is created in the zone of the large diameter portion 47d, at a distance from the first tongue 41. In fact, the first tongue 41 tends to be displaced radially inwardly relative to the second tongue 42. It should be understood that this displacement is relative insofar as during diametral expansion, the tongues 41 and 42 are both displaced radially outwardly and the tongue 41 tends to be displaced less than the tongue 42, whence a relative radial displacement allows the creation of the supplemental metal-metal contact seal 61 between the facing surfaces of the first and second tongues 41 and 42. These displacements are well adapted to degrees of expansion of more than 15%, preferably more than 20%.

The invention claimed is:

1. An expandable threaded connection used in exploration or working of hydrocarbon wells, comprising:
   a first tubular component comprising a male end comprising a first and a second threaded zone disposed on its external peripheral surface and an insertion region provided between said first and second threaded zones, the insertion region comprising a first annular tongue comprising a prominent abutment face, and a first concavity adjacent to the first tongue and set back therefrom;
   a second tubular component comprising a female end comprising a third and a fourth threaded zone disposed on its internal peripheral surface and an insertion region provided between said third and fourth threaded zones, the insertion region comprising a second annular tongue comprising a prominent abutment face, and a second concavity adjacent to the second tongue and set back therefrom;
   the first and second threaded zones of the male end matching the third and fourth threaded zones of the female end for makeup together, the threaded zones comprising respectively male and female threads;
   the first and second tongues being respectively engaged in the second and first concavities in a made up condition, an abutment face of at least one of the first and second tongues being in contact with respectively the second or first concavity, the male end comprising a first surface between the first threaded zone and the first tongue and the female end comprising a second surface between the third threaded zone and the second concavity;
   wherein in the made up condition, said first and second surfaces define an annular space comprising a zone with a first radial dimension on the first and third threaded zone side and a zone with a second radial dimension on the first tongue side and second concavity side, said zone with the second radial dimension after expansion being configured to form a metal-metal contact seal, the first tongue then bearing on the second tongue,
   wherein the first radial dimension is larger than the second radial dimension, and
   wherein the first surface of the male end has a first substantially cylindrical portion close to the first threaded zone, a second substantially tapered portion with a substantially tapered shape with a diameter which increases from the first substantially cylindrical portion, a rounded peak and a third portion with a substantially tapered shape and with a diameter which decreases with distance form the first threaded zone.

2. A threaded connection according to claim 1, wherein a surface of the male end disposed between the first tongue and the first concavity and a surface of the female end disposed between the second tongue and the second concavity are in contact in the made up condition.

3. A threaded connection according to claim 1, wherein the first surface of the male end has a maximum diameter which is located at between one third and two thirds of its length.

4. A threaded connection according to claim 1, wherein closer to the first tongue, the first surface of the male end has a diameter which is greater than its diameter closer to the first threaded zone.

5. A threaded connection according to claim 1, wherein the metal-metal contact seal is produced by a bulged portion closer to the first tongue of the male end.

6. A threaded connection according to claim 1, wherein the zone with the first radial dimension on the first and third threaded zone side is defined between an internal tapered surface and an external surface in a form of a circular arc.

7. A threaded connection according to claim 1, wherein the zone with the second radial dimension on the first tongue and second concavity side has a zero radial dimension.

8. A threaded connection according to claim 1, wherein the first and third threaded zones and/or the second and fourth threaded zones comprise radially self-hooking threads, or in a form of a dovetail.

9. A process for obtaining a tight threaded connection, starting from a threaded connection according to claim 1, wherein said threaded connection undergoes diametral expansion in a plastic deformation range using an expansion ball with a diameter greater than the internal diameter of the tubular components which is displaced axially in the connection, said annular space being dimensioned such that the first surface undergoes radial displacement towards the second surface during diametral expansion such that said first and second surfaces interfere radially forming a metal-metal seal while allowing the zone with the first radial dimension to subsist.

10. A process according to claim 9, wherein the first surface undergoes an axial displacement in the direction of the first tongue, the first tongue is tipped in the direction of the second tongue such that an internal surface of the first tongue and an external surface of the second tongue interfere radially forming a metal-metal seal.

11. A process according to claim 9, wherein a degree of expansion is more than 15%, or more than 20%.

12. A threaded connection according to claim 1, wherein the zone with the first radial dimension on the first and third threaded zone side is defined between an internal surface in a form of a circular arc and a tapered external surface, or between two surfaces in a form of a circular arc.

13. A threaded connection according to claim 12, wherein the first surface of the male end and/or the second surface of the female end has an annular groove closer to the first threaded zone.

14. A threaded connection according to claim 12, wherein the groove has a depth in a range of 6% to 13% of the thickness of the regular section of the tubular component.

15. An expandable threaded connection used in exploration or working of hydrocarbon wells, comprising:
- a first tubular component comprising a male end comprising a first and a second threaded zone disposed on its external peripheral surface and an insertion region provided between said first and second threaded zones, the insertion region comprising a first annular tongue comprising a prominent abutment face, and a first concavity adjacent to the first tongue and set back therefrom;
- a second tubular component comprising a female end comprising a third and a fourth threaded zone disposed on its internal peripheral surface and an insertion region provided between said third and fourth threaded zones, the insertion region comprising a second annular tongue comprising a prominent abutment face, and a second concavity adjacent to the second tongue and set back therefrom;
- the first and second threaded zones of the male end matching the third and fourth threaded zones of the female end for makeup together, the threaded zones comprising respectively male and female threads;
- the first and second tongues being respectively engaged in the second and first concavities in a made up condition, an abutment face of at least one of the first and second tongues being in contact with respectively the second or first concavity, the male end comprising a first surface between the first threaded zone and the first tongue and the female end comprising a second surface between the third threaded zone and the second concavity;
- wherein in the made up condition, said first and second surfaces define an annular space comprising a zone with a first radial dimension on the first and third threaded zone side and a zone with a second radial dimension on the first tongue side and second concavity side, said zone with the second radial dimension after expansion being configured to form a metal-metal contact seal, the first tongue then bearing on the second tongue,
- wherein the first radial dimension is larger than the second radial dimension,
- wherein the second radial dimension has a zero radial dimension,
- wherein the first surface of the male end has a maximum diameter which is located at between one third and two thirds of its length, and
- wherein the first surface of the male end has a first substantially cylindrical portion close to the first threaded zone, a second substantially tapered portion with a substantially tapered shape with a diameter which increases from the first substantially cylindrical portion, a rounded peak and a third portion with a substantially tapered shape and with a diameter which decreases with distance form the first threaded zone.

* * * * *